United States Patent [19]

Ishizawa et al.

[11] Patent Number: 5,468,696
[45] Date of Patent: Nov. 21, 1995

[54] HIGHLY CORROSION RESISTANT α-SIALON-LIKE SINTERED BODY AND PROCESS FOR PREPARATION THEREOF

[75] Inventors: Kenki Ishizawa, Tokyo; Nobuo Ayuzawa; Akira Shiranita, both of Okayama; Masamichi Takai, Bizen, all of Japan

[73] Assignee: Shinagawa Refractories Co., Ltd., Tokyo, Japan

[21] Appl. No.: 199,308

[22] PCT Filed: Sep. 1, 1992

[86] PCT No.: PCT/JP92/01115

§ 371 Date: Mar. 2, 1994

§ 102(e) Date: Mar. 2, 1994

[87] PCT Pub. No.: WO93/04997

PCT Pub. Date: Mar. 18, 1993

[30] Foreign Application Priority Data

Sep. 4, 1991 [JP] Japan ................... 3-250344

[51] Int. Cl.⁶ ........................................ C04B 35/599
[52] U.S. Cl. .................................................. 501/98
[58] Field of Search ................................. 501/98, 96

[56] References Cited

U.S. PATENT DOCUMENTS

| | | | |
|---|---|---|---|
| 4,401,768 | 8/1983 | Morgan | 501/98 |
| 4,425,141 | 1/1984 | Buljan et al. | 501/98 X |
| 4,801,564 | 1/1989 | Baba | 501/98 X |
| 4,818,635 | 4/1989 | Ekström et al. | 501/98 X |
| 5,032,553 | 7/1991 | Tarry | 501/98 X |
| 5,173,458 | 12/1992 | Nishioka et al. | 501/98 X |
| 5,200,374 | 4/1993 | Yamada et al. | 501/98 |

FOREIGN PATENT DOCUMENTS

| | | |
|---|---|---|
| 0250593 | 1/1988 | European Pat. Off. . |
| 56-129667 | 10/1981 | Japan . |
| 260471 | 4/1984 | Japan . |
| 260472 | 4/1984 | Japan . |
| 91065 | 4/1984 | Japan . |

OTHER PUBLICATIONS

W Braue et al, "Devitrification Effects of Grain Boundary Phases on High Temperature Strength of Sintered $Si_3N_4$ Materials", Proceedings of the Second Int. Symp. Apr. 14–17, 1986 pp. 502–510.

Mitomo Mamoru, et al., Sintered alpha–Sialon products, Chemical Abstracts, vol. 104, No. 20, Jun. 1986, abstract No. 229454q.

Database WPI, section Ch, Week 8639, Derwent Publications, Ltd., London, GB, AN 86–255339, Aug. 1986.

*Primary Examiner*—Karl Group
*Attorney, Agent, or Firm*—Sherman and Shalloway

[57] ABSTRACT

A highly corrosion resistant α-sialon-like sintered body consisting essentially of an α-sialon composition represented by the composition formula $$M_x(Si,Al)_{12}(O,N)_{16}$$

wherein M is at least one α-sialon-soluble element selected from the group consisting of Yb, Er and Dy, and $0 < x \leq 0.8$, and $Sc_2O_3$ insoluble in the α-sialon composition and being in an amount of 0.01 to 15 wt % based on the weight of the sintered body, and containing as an intergranular phase a $Sc_2O_3$–$SiO_2$ complex wherein the mole ratio of $Sc_2O_3$ to $SiO_2$ is within the range of 1:0.1 to 1:50. This sintered body has not only mechanical characteristics such as strength and toughness, but high corrosion resistance such that it can withstand use under an environment where corrosion resistance such as oxidation resistance or chemical resistance is required.

6 Claims, No Drawings

HIGHLY CORROSION RESISTANT α-SIALON-LIKE SINTERED BODY AND PROCESS FOR PREPARATION THEREOF

TECHNICAL FIELD

This invention relates to an α-sialon-like sintered body having high corrosion resistance and a process for preparation thereof.

BACKGROUND ART

Silicon nitride which is a ceramic promising as a high temperature structural material is hard to sinter, and, heretofore, it is general to prepare a sintered body therefrom using an oxide such as $Y_2O_3$ or $Al_2O_3$ as a sintering aid(s). By using these sintering aids, there have become possible dense sintering at normal pressure and application to parts of complicated shapes. Further, as for α-sialon sintered bodies, the present inventors disclosed in Japanese Laid-Open Patent Publication Nos. 260471/1985, 260472/1985 and 91065/1986 that sintered bodies having excellent mechanical characteristics could be obtained by a normal pressure sintering method.

However, the oxide assistants are usually contained in an amount of the order of 10 wt % in total in such a silicon nitride sintered body, and often remain as an intergranular phase in the sintered body. In α-sialon sintered bodies, the same phenomenon can take place in that part of the dissolved elements remains in the grain boundary. When silicon nitride ceramics are used as high temperature structural components, the presence of the intergranular phase in the sintered bodies is one of causes whereby lowering of high temperature strength and corrosion resistance is brought about, and for solution thereof, investigations of additives and researches on crystallization treatment of the intergranular phase, etc. are extensively made.

For example, W. Braue et al. reported in Proc. of International Symposium on Ceramics Components for Engine, 1986 FRG, items 503 to 510 that high temperature strength characteristics are enhanced by intergranular crystallization of silicon nitride using $Y_2O_3$ or $Al_2O_3$ as a sintering assistant.

α-sialon is a substance having structure such that Al and O took the place of and dissolved at the Si and N positions of the $α-Si_3N_4$ crystalline structure, respectively, and at the same time, metal elements such as Li, Mg and Y made an invasion between the crystal lattices and dissolved therein, and has a characteristic that it is stable at high temperatures. Metal elements which make an invasion and dissolve are added usually in the form of an oxide, part of these oxides remain as intergranular phases without dissolving. Although several % of $SiO_2$ is contained as an impurity due to surface oxidation, etc. in silicon nitride as a starting material, it is known that such $SiO_2$ often reacts with $Y_2O_3$ or the like as the dissolved element in α-sialon and the product remains as intergranular phases, and the presence of these intergranular phases becomes a cause whereby lowering of high temperature characteristics and corrosion resistance is brought about.

Although researches for reduction of the amount of the intergranular phases and enhancement of characteristics by crystallization treatment, etc. have so far been made, the present inventors found as a result of intense researches that although crystallization treatment, etc. are effective for improvement of high temperature strength characteristics, long time oxidation at a temperature of 1200° C. or higher causes problems particularly on corrosion resistance, for example that foams are formed and/or cracks are formed on the surface.

This invention aims to provide a highly corrosion resistant α-sialon-like sintered body, for solving the above problems, capable of withstanding use under an environment where not only mechanical characteristics such as strength and toughness, but corrosion resistance such as oxidation resistance or chemical resistance are required, and a process for preparation thereof.

The present inventors had made intense researches for solving the above problems, and as a result they found, now, that a sintered body obtained by mixing $Sc_2O_3$ incapable of dissolving in α-sialon with an α-sialon composition consisting of silicon nitride, aluminum nitride and an oxide of metal element M wherein M represents Yb, Er or Dy, molding the resultant mixture, and then sintering the molding in a non-oxidizing atmosphere at a temperature within the range of 1600° to 2000° C., and a sintered body obtained by further heat treating the above sintered body according to necessity are excellent not only in mechanical characteristics, but in corrosion resistance.

DISCLOSURE OF INVENTION

This invention provides a highly corrosion resistant α-sialon-like sintered body consisting substantially of an α-sialon composition represented by the composition formula

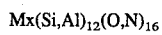

$M_x(Si,Al)_{12}(O,N)_{16}$ wherein M is at least one α-sialon-soluble element selected from the group consisting of Yb, Er and Dy, and $0 < x \leq 0.8$,
and $Sc_2O_3$ insoluble in the α-sialon composition and being in an amount of 0.01 to 15 wt % based on the weight of the sintered body, and containing as an intergranular phase a $Sc_2O_3$—$SiO_2$ complex wherein the mole ratio of $Sc_2O_3$ to $SiO_2$ is within the range of 1:0.1 to 1:50.

The term "α-sialon Composition" used in this description is used as including not only one consisting essentially of only a single phase of an α-sialon crystal phase, but one consisting essentially of a composite tissue of an α-sialon crystal phase and a β-silicon nitride crystal phase, and these crystal phase and composite structure can be ones formed by sintering the raw material mixture, or can be formed already at the stage of the raw material mixture before sintering.

Incidentally, silicon nitride and aluminum nitride as raw materials usually contain oxygen as an inevitable anion impurity. The β-silicon nitride crystal phase mentioned in this description includes a crystal phase in which such an inevitable anion impurity dissolved, although a case is excluded where $Al_2O_3$ and/or $SiO_2$ are intentionally added for the purpose of forming β-sialon.

The α-sialon composition constituting part of the α-sialon-like sintered body of this invention is represented by the composition formula

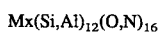

$M_x(Si,Al)_{12}(O,N)_{16}$

In the formula, M is a metal element which makes an invasion into and dissolves in α-sialon, and in this invention an element selected from the group consisting of Yb, Er and Dy is used as the element. Among these soluble elements, particularly preferable in this invention is Yb. These metal elements dissolve in $α-Si_3N_4$ and stabilize α-sialon, and at the same time react with $Sc_2O_3$ as an insoluble component mentioned below to form a second phase containing $Sc_2O_3$. The term "second phase" is used to indicate all the phases other than the above sialon composition of the α-sialon-like sintered body of this invention.

Further, the value of x in the above formula denotes the amount of the metal element M dissolved, and a number within the range of $0<x\leq 0.8$, preferably $0.1\times\leq 0.5$, more preferably $0.1\times\leq 0.4$. The value of this x can be one factor determining the composition range of the crystal phase in the α-sialon composition, and when the value of x is within the range of $0<x\leq 0.3$, the α-sialon composition represented by the above composition formula consists essentially of a composite tissue of α-sialon crystal phases and β-silicon nitride crystal phases, and when the value of x is within the range of $0.3x\leq 0.8$, the α-sialon composition consists essentially of a single phase of an α-sialon crystal phase. Namely, the stable region of α-sialon is within $0.3<x\leq 0.8$, $x=0.3$ corresponds to the lower solubility limit of α-sialon, and in the region of $x<0.3$ the α-sialon composition consists of a mixture of stabilized α-sialon ($x=0.3$) crystal phases with β-silicon nitride crystal phases.

It was brought to light now in this invention that when the above α-sialon composition is sintered together with a certain amount of $Sc_2O_3$ incapable of dissolving in the α-sialon composition, the corrosion resistance of the resultant sintered body is remarkably enhanced. The content of $Sc_2O_3$ constituting the sintered body of this invention together with the α-sialon composition is within the range of 0.01 to 15 wt %, preferably 0.01 to 10 wt %, more preferably 0.05 to 5 wt % based on the weight of sintered body. When the content of $Sc_2O_3$ is under 0.01 wt %, the effect of $Sc_2O_3$ addition is little, and when it exceeds 15 wt %, high temperature strength becomes lower and oxidation resistant characteristics becomes deteviorated.

Although silicon nitride, one of raw materials for preparation of the α-sialon composition usually contains $SiO_2$ of the order of several % as an inevitable impurity due to surface oxidation, etc., this $SiO_2$ usually reacts with $Yb_2O_3$, $Er_2O_3$ and/or $Dy_2O_3$ as a supply source of elements soluble in α-sialon, and remains in the intergranular phase.

On the other hand, when $Sc_2O_3$ incapable of dissolving in the α-sialon composition is added to the α-sialon composition and the mixture is sintered, $Sc_2O_3$ plays a role as a sintering assistant and contributes to the acceleration of the denseness of the resultant sintered body, and further part of the added $Sc_2O_3$ reacts with $SiO_2$ remaining in the above intergranular phase to form a $Sc_2O_3$—$SiO_2$ complex in the intergranular phase. It is surmised that the high corrosion resistance of the sintered body of this invention arises from formation of an intergranular phase tissue consisting essentially of such $Sc_2O_3$—$SiO_2$ complex.

As to the $Sc_2O_3$—$SiO_2$ system, its liquid phase formation temperature is 1660° C. or higher as seen from its phase equilibrium chart and it has a high melting point, and it is necessary to form an intergranular phase of such a high melting point for the purpose of enhancing the high temperature characteristics of the resultant sintered body as well as the corrosion resistance thereof.

The ratio of $Sc_2O_3$ to $SiO_2$ in the $Sc_2O_3$—$SiO_2$ complex forming an intergranular phase can generally be within the range of 1:0.1 to 1:50 by mole ratio. When the mole ratio is under 1:0.1, the high temperature strength of the resultant sintered body is low, and when the mole ratio exceeds 1:50, the effect of $Sc_2O_3$ addition becomes small and the denseness of the sintered body becomes insufficient. Therefore, the mole ratio of $Sc_2O_3$ to $SiO_2$ is preferably within the range of 1:0.2 to 1:50, particularly 1:0.4 to 1:40. The amount of $Sc_2O_3$ and $SiO_2$ in the intergranular phase can be determined by an analytical electron microscope. Further, the mole ratio of $Sc_2O_3$ to $SiO_2$ of the $Sc_2O_3$—$SiO_2$ complex in the intergranular phase can, for example, be adjusted by adjusting the addition amount of $Sc_2O_3$ or controlling the amount of oxygen in the silicon nitride raw material.

The α-sialon-like sintered body provided by this invention can, for example, be prepared as follows.

First, silicon nitride, aluminum nitride and at least one oxide selected from $Yb_2O_3$, $Er_2O_3$ and $Dy_2O_3$ in a predetermined ratio necessary for formation of the α-sialon composition represented by the above composition formula, and a predetermined amount of $Sc_2O_3$ insoluble in the α-sialon composition are mixed. It is also possible to use as $Yb_2O_3$, $Er_2O_3$, $Dy_2O_3$ and $Sc_2O_3$ precursor compounds convertible to these oxides, respectively, under the sintering condition. Although the mixing can be carried out using a ball mill, a vibrating mill or the like, it is preferable in that case to carry out the mixing in an organic solvent so as to prevent the oxidation of the raw material powders, and further, in order to avoid mixing $Al_2O_3$ from crushing balls or the like thereinto, it is desirable to use α-sialon-made balls and an α-sialon-made vessel or a resin-made vessel. The resultant mixture is granulated and dried using a spray dryer or the like to give a molding raw material.

Molding can be carried out using, for example die molding, hydrostatic pressure press molding, injection molding or the like. The resultant molded body is subjected to degreasing treatment before sintering because it usually contains organic matters such as the binder. The molded body is then sintered in a non-oxidizing atmosphere at a temperature within the range of 1600° to 2000° C., but the sintering temperature is preferably within the range of 1600° to 1800° C., and the sintering time is usually 30 minutes to 10 hours. A sufficiently dense sintered body can be obtained by normal pressure sintering, but HIP, gas pressure sintering and hot press can be used if necessary.

Thus obtainable α-sialon-like sintered body of this invention is very excellent in corrosion resistance such as oxidation resistance or chemical resistance. This high corrosion resistance of the sintered body of this invention can be attained when Yb, Er and/or Dy are used as metal elements which make an invasion into α-sialon and dissolve therein. This is seen, for example from the fact that when an oxidation test was carried out, in the case of the sintered body of this invention a dense and smooth oxidation membrane is formed on the surface after the oxidation test, and it exhibits excellent corrosion resistance combined with the effect of $Sc_2O_3$ addition, but in the case of sintered bodies formed using soluble elements other than the above, phenomena such as foaming generally arise on the sample surface, and they come to be inferior in corrosion resistance.

The α-sialon-like sintered body of this invention is excellent in mechanical characteristics, for example flexural strength, toughness, etc., and as to flexural strength those having a flexural strength higher than 1200 MPa (JIS R1601, three point bending) are obtained. It is one characteristic of the α-sialon-like sintered body of this invention that it is excellent in mechanical characteristics as well as chemical stabilities such as corrosion-resistance.

Further, it was revealed as to the sintered body of this invention that the α-sialon content in the sintered body changes depending on the addition amount of $Sc_2O_3$. For example, in proportion as the addition amount of $Sc_2O_3$ is increased, the amount of the α-sialon crystal phase is decreased. The reason is surmised to be that the added $Sc_2O_3$ reacts with $Yb_2O_3$, $Er_2O_3$ and $Dy_2O_3$ as the component dissolved in α-sialon to form a complex, but this indicates that the amount of the α-sialon crystal phases in the sintered body can be controlled by the addition amount of $Sc_2O_3$, and thereby it becomes possible to control the characteristics of the sintered body.

In α-sialon, the amount ratio between the α-sialon crystal phase and the β-silicon nitride crystal phase changes in proportion to the amount x of the dissolved metal element M, and thereby mechanical characteristics such as hardness, toughness and strength change, and further, similar control can also be made by addition of $Sc_2O_3$. Although the α-sialon composition has a characteristic that it is excellent in mechanical characteristics such as particularly strength and toughness in a low dissolved region of $x \leq 0.3$, the α-sialon composition of this composition region is generally hard to sinter. However, the sintered body of this invention has an advantage that since $Sc_2O_3$ plays a role as a sintering assistant in the course of sintering, even when it is a sintered body of this composition region, sintering properties are enhanced, and an α-sialon-like sintered body excellent both in high temperature characteristics and corrosion resistance and in mechanical characteristics can readily be obtained.

EXAMPLE

This invention is further specifically described below according to examples.

ball mill using a resin-made pot and α-sialon-made balls. The resultant mixture was dried and molded at a pressure of 1.5 t/cm² using a cold hydrostatic pressure press, and the resultant molding was sintered in a nitrogen atmosphere at 1700° C. for 5 hours to obtain a sintered body. A test piece of 3×4×40 mm was prepared from each of the resultant sintered bodies by surface grinding, and subjected to a test for evaluation of oxidation characteristics. The oxidation test was carried out by holding the test piece in the air at 1400° C. for 100 hours, and evaluation was made by a weight increase value by oxidation and appearance after the test.

The analyses of Sc, Si, etc. in the intergranular phase was carried out using an analytical electron microscope.

The results are shown in Table-1. The compounding of No. 1 to No. 7 relates to the products of this invention, and No. 8 to No. 10 are comparative examples.

It is seen from the results of Table-1 that the weight increase value by oxidation of the α-sialon-like sintered body of this invention is excellent and 1.0 mg/cm² or less, and the samples after the oxidation test are covered with smooth oxide film without any foam, etc. On the other hand, in the comparative examples wherein Y was used as a soluble element or $Sc_2O_3$ was excessively added, the weight increase values by oxidation are larger.

TABLE 1

| Compounding No. | Composition of raw materials | | | Characteristics of sintered body | | Note |
| --- | --- | --- | --- | --- | --- | --- |
| | Amount dissolved in α-sialon x | Element dissolved in α-sialon M | $Sc_2O_3$ Addition amount (wt %) | Mole ratio of $Sc_2O_3$ to $SiO_2$ in the intergranular phase | Weight increase value by oxidation (mg/cm²) | |
| 1 | 0.2 | Yb | 0.5 | 1:5.9 | 0.6 | this invention |
| 2 | 0.2 | Yb | 2.5 | 1:1.1 | 0.5 | this invention |
| 3 | 0.2 | Yb | 5.0 | 1:0.5 | 0.4 | this invention |
| 4 | 0.2 | Dy | 1.0 | 1:2.9 | 0.7 | this invention |
| 5 | 0.2 | Er | 1.0 | 1:3.0 | 0.8 | this invention |
| 6 | 0.4 | Yb | 1.0 | 1:2.5 | 1.0 | this invention |
| 7 | 0.4 | Yb | 5.0 | 1:0.4 | 0.9 | this invention |
| 8* | 0.2 | Y | 2.5 | 1:1.2 | 4.7 | Comparative example |
| 9* | 0.2 | Y | 5.0 | 1:0.6 | 4.2 | Comparative example |
| 10 | 0.2 | Yb | 25.0 | 1:0.1 | 2.9 | Comparative example |

*Compounding of Nos. 8 and 9 are those disclosed in Japanese Laid-Open Patent Publication No. 260472/1985.

Example 1

Silicon nitride (average particle size: 1 μm, cation impurity content: 0.2% or less, oxygen content: 0.8%), aluminum nitride (average particle size: 1 μm, cation impurity content: 0.2% or less, oxygen content: 1.0%), and $Yb_2O_3$, $Er_2O_3$ or $Dy_2O_3$ (in each case, average particle size: 1.2 μm, purity: 99.9%), and $Sc_2O_3$ (average particle size: 1.0 μm, purity: 99.9%) as raw materials were compounded in each composition ratio shown in the following Table-1, and kneaded. The kneading was carried out for 30 hours in ethanol in a Example 2

Silicon nitride (average particle size: 0.8 μm, cation impurity content: 0.2% or less, oxygen content: 1.2%), aluminum nitride (average particle size: 1.0 μm, cation impurity content: 0.2% or less, oxygen content: 1.0%), and $Yb_2O_3$, $Er_2O_3$ or $Dy_2O_3$ (in each case, average particle size: 1.2 μm, purity: 99.9%), and $Sc_2O_3$ (average particle size: 1.0 μm, purity: 99.9%) as raw materials were compounded in the same composition ratios as in Example 1, and kneaded.

The kneading was carried out for 20 hours in ethanol in a vibration mill using a resin-made pot and α-sialon-made balls. The resultant mixture was dried by a spray dryer and molded at a pressure of 1.5 t/cm² using a cold hydrostatic pressure press, and the resultant molding was heated in a nitrogen atmosphere at a pressure of 9.8 kgf/cm² at 1750° C. for 3 hours to carry out sintering.

A test piece of 3×4×40 mm was prepared from each of the resultant sintered bodies, and subjected to evaluation of flexural strength (room temperature and 1250° C.) and an oxidation test.

The bending test was carried out by three point bending of a span of 30 mm, and the oxidation test was carried out under the same conditions as in Example 1. The results are shown in Table-2. It is seen from the results of Table-2 that the α-sialon-like sintered body of this invention has only small lowering of high temperature strength and is excellent in high temperature characteristics. On the other hand, as shown in the comparative examples, in the cases where Y was used as a soluble element, weight increase values are large, and in the case where $Sc_2O_3$ was used excessively, the lowering of high temperature strength is very large.

TABLE 2

| | Composition of raw materials | | | Characteristics of sintered body | | | |
|---|---|---|---|---|---|---|---|
| Compounding No. | Amount dissolved in α-sialon x | Element dissolved in α-sialon M | $Sc_2O_3$ Addition amount (wt %) | Room temperature strength (wt %) | 1250° C. strength (wt %) | Weight increase value by oxidation (mg/cm²) | Note |
| 1 | 0.2 | Yb | 0.5 | 970 | 850 | 0.5 | this invention |
| 2 | 0.2 | Yb | 2.5 | 940 | 820 | 0.4 | this invention |
| 3 | 0.2 | Yb | 5.0 | 840 | 780 | 0.4 | this invention |
| 4 | 0.2 | Dy | 1.0 | 930 | 820 | 0.5 | this invention |
| 5 | 0.2 | Er | 1.0 | 950 | 830 | 0.7 | this invention |
| 6 | 0.4 | Yb | 1.0 | 830 | 710 | 0.8 | this invention |
| 7 | 0.4 | Yb | 5.0 | 800 | 700 | 0.7 | this invention |
| 8 | 0.2 | Y | 2.5 | 920 | 790 | 4.2 | Comparative example |
| 9 | 0.2 | Y | 5.0 | 830 | 690 | 3.9 | Comparative example |
| 10 | 0.2 | Yb | 25.0 | 770 | 440 | 2.1 | Comparative example |

Industrial Applicability

As stated above, the α-sialon-like sintered body of this invention has excellent corrosion resistance, high temperature characteristics, mechanical strength, etc., and can suitably be used, for example in valve parts, engine members, parts for machine tools, cutting tools, etc.

We claim:

1. A highly corrosion resistant α-sialon sintered body consisting essentially of an α-sialon composition represented by the composition formula $$M_x(Si,Al)_{12}(O,N)_{16}$$

wherein M is at least one α-sialon-soluble element selected from the group consisting of Yb, Er and Dy, and $0 < x \leq 0.8$, and $Sc_2O_3$, wherein said $Sc_2O_3$ is insoluble in the α-sialon composition and is present in an amount of 0.01 to 15 wt % based on the weight of the sintered body, and wherein the sintered body contains as an intergranular phase a $Sc_2O_3$—$SiO_2$ complex having a mole ratio of $Sc_2O_3$ to $SiO_2$ within the range of 1:0.1 to 1:50.

2. The sintered body according to claim 1 wherein the soluble element M is Yb.

3. The sintered body according to claim 1 wherein the value of x is within the range of $0.1 \leq x \leq 0.4$.

4. The sintered body according to claim 1 wherein the $Sc_2O_3$ is present in an amount in the range of from 0.05 to 5.0 wt % based on the weight of the sintered body.

5. The sintered body according to claim 1 wherein the mole ratio of $Sc_2O_3$ to $SiO_2$ in the $Sc_2O_3$—$SiO_2$ complex is within the range of 1:0.4 to 1:40.

6. A process for preparation of a highly corrosion resistant α-sialon sintered body containing as an intergranular phase a $Sc_2O_3$ complex having a mole ratio of $Sc_2O_3$ to $SiO_2$ within the range of 1:0.1 to 1:50 which comprises sintering a mixture consisting essentially of silicon nitride, aluminum nitride and at least one oxide selected from the group consisting of $Yb_2O_3$, $Er_2O_3$ and $Dy_2O_3$ in a ratio necessary for formation of an α-sialon composition represented by the composition formula $$M_x(Si,Al)_{12}(O,N)_{16}$$

wherein M is at least one α-sialon-soluble element selected from the group consisting of Yb, Er and Dy, and $0 < x \leq 0.8$, and $Sc_2O_3$, which is insoluble in the α-sialon composition and is present in an amount of from 0.01 to 15 wt % based on the weight of the sintered body, in a non-oxidizing atmosphere at a temperature within the range of from 1600° C. to 2000° C.

* * * * *